US009443293B2

(12) United States Patent
Setlak et al.

(10) Patent No.: US 9,443,293 B2
(45) Date of Patent: *Sep. 13, 2016

(54) ELECTRONIC DEVICE INCLUDING SUB-ARRAY BASED DEBLURRING OF A BLURRED FINGER IMAGE AND RELATED METHODS

(71) Applicant: APPLE INC., Cupertino, CA (US)

(72) Inventors: Dale R. Setlak, Melbourne, FL (US); Martin Subert, Bohemia (CZ); Ondrej Konopka, Bohemia (CZ); Petr Kohout, Bohemia (CZ); Pavel Mrazek, Bohemia (CZ); Giovanni Gozzini, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,341

(22) Filed: Feb. 22, 2016

(65) Prior Publication Data
US 2016/0171668 A1    Jun. 16, 2016

Related U.S. Application Data

(63) Continuation of application No. 13/960,062, filed on Aug. 6, 2013, now Pat. No. 9,298,966.

(51) Int. Cl.
*G06K 9/00* (2006.01)
*G06T 5/00* (2006.01)

(52) U.S. Cl.
CPC ........... *G06T 5/003* (2013.01); *G06K 9/00006* (2013.01)

(58) Field of Classification Search
None
See application file for complete search history.

(56) References Cited

U.S. PATENT DOCUMENTS

| | | | |
|---|---|---|---|
| 5,940,526 A | 8/1999 | Setlak et al. | |
| 5,953,441 A | 9/1999 | Setlak | |
| 5,963,679 A | 10/1999 | Setlak | |
| 6,088,471 A | 7/2000 | Setlak et al. | |
| 9,298,966 B2* | 3/2016 | Setlak | G06K 9/0002 |
| 2006/0153431 A1* | 7/2006 | Ando | G06K 9/00067 382/124 |
| 2008/0159568 A1* | 7/2008 | Asada | H04R 1/1041 381/150 |
| 2012/0085822 A1* | 4/2012 | Setlak | G06K 9/605 235/439 |

(Continued)

OTHER PUBLICATIONS

Ter Haar Romeny, "Deblurring Gaussian Blur", Front End Vision and Multi-Scale Image Analysis, Multi-Scale Computer Vision Theory and Applications, written in Mathematics, Computational Imaging and Vision, vol. 27, 2003, 277-284.

(Continued)

*Primary Examiner* — Stephen R Koziol
*Assistant Examiner* — Delomia L Gilliard
(74) *Attorney, Agent, or Firm* — Allen, Dyer, Doppelt, Milbrath & Gilchrist, P.A.

(57) ABSTRACT

An electronic device may include a finger biometric sensor that includes an array of electric field sensing pixels and image data output circuitry coupled thereto and capable of processing the image data from each of sub-arrays of the array of electric field sensing pixels. The electronic device may also include a dielectric layer over the array of electric field sensing pixels and causing electric field diffusion so that the image data output circuitry generates image data corresponding to a blurred finger image. The electronic device also includes deblurring circuitry coupled to the image data output circuitry and capable of processing the image data from each of the plurality of sub-arrays of the array of electric field sensing pixels to produce processed image data representative of a deblurred finger image.

25 Claims, 9 Drawing Sheets

(56) References Cited

U.S. PATENT DOCUMENTS

| | | | |
|---|---|---|---|
| 2012/0086794 A1* | 4/2012 | Burcham | G06K 9/00033 348/77 |
| 2012/0127128 A1 | 5/2012 | Large et al. | |
| 2012/0300992 A1 | 11/2012 | Ivanov et al. | |
| 2013/0307818 A1 | 11/2013 | Pope et al. | |
| 2014/0133714 A1* | 5/2014 | Ivanov | G06K 9/00013 382/124 |
| 2014/0171158 A1 | 6/2014 | Setlak et al. | |
| 2014/0270416 A1 | 9/2014 | Minteer et al. | |
| 2015/0042595 A1 | 2/2015 | Setlak et al. | |
| 2015/0043791 A1* | 2/2015 | Setlak | G06K 9/0002 382/124 |

OTHER PUBLICATIONS

Lefkimmiatis, "Hessian-Based Norm Regularization for Image Restoration with Biomedical Applications", 2010 IEEE, pp. 1-13.

Goldsmith, "Wireless Communications", Cambridge University Press, Chapter 11, 2005, pp. 1-25.

Cheng, "Interpixel capacitive coupling", RIT Scholar Works, Rochester Institue of Technology, Jan. 2009, pp. 1-136.

\* cited by examiner

ELECTRONIC DEVICE INCLUDING SUB-ARRAY BASED DEBLURRING OF A BLURRED FINGER IMAGE AND RELATED METHODS

FIELD OF THE INVENTION

The present invention relates to the field of electronics, and, more particularly, to electronic devices including finger biometric sensors and related methods.

BACKGROUND OF THE INVENTION

Fingerprint sensors that measure the fingerprint pattern using electric field sensing methods and capacitive sensing methods have become well established. U.S. Pat. Nos. 5,940,526 and 5,963,679 are examples of this type of fingerprint sensor, the entire contents of which are incorporated herein by reference. These systems measure the fingerprint pattern by generating an electric field between the finger and the sensor array, and measuring the spatial fluctuations in field strength at the sensor array caused by the shape of the fingerprint ridge and valley pattern.

In some recent applications, it may be desirable to capture images of fingerprint patterns from fingers that are farther away from the sensor array than is typical with today's technologies. Unfortunately, as the finger gets farther away from the sensor array, for example when a relatively thick dielectric lies between the sensor array and the finger, the relatively thick dielectric between the sensor array and the finger may cause variations in the electric field between the finger and the sensor array. These variations may cause image data generated by the finger sensor to be representative of a blurred image.

SUMMARY

An electronic device may include a finger biometric sensor that includes an array of electric field sensing pixels and image data output circuitry coupled thereto and is capable of outputting image data from a plurality of sub-arrays of the array of electric field sensing pixels. The electronic device may also include a dielectric layer over the array of electric field sensing pixels and causing electric field diffusion so that the image data output circuitry generates image data corresponding to a blurred finger image. The electronic device may further include deblurring circuitry coupled to the image data output circuitry and capable of processing the image data from each of the plurality of sub-arrays of the array of electric field sensing pixels to produce processed image data representative of a deblurred finger image. Accordingly, the electronic device deblurs a blurred finger image caused by electric field diffusion from the dielectric layer.

The plurality of sub-arrays may include at least one sub-array adjacent a border of the array, for example. The plurality of sub-arrays may also include at least one internal sub-array spaced inwardly from a border of the array.

The electric field diffusion has a diffusion function associated therewith. The deblurring circuitry may be capable of processing the image data in accordance with respective deblurring functions for each of the plurality of sub-arrays based upon the diffusion function, for example.

The diffusion function may include a Gaussian function, and the respective deblurring functions may each include an inverse Gaussian function. The deblurring circuitry may be capable of storing a plurality of deblurring coefficients for each of the respective deblurring functions.

The dielectric layer may have a non-uniform thickness, for example. The deblurring circuitry may be capable of processing the image data to produce image data representative of the deblurred finger image based upon the non-uniform thickness. The deblurring circuitry may include a deblurring processor and memory coupled thereto and capable of storing the image data.

The finger biometric sensor may further include drive circuitry coupled to the array of electric field sensing pixels. The finger biometric sensor may include a finger coupling electrode adjacent the array of electric field sensing pixels and coupled to the drive circuitry, for example.

A method aspect is directed to a finger biometric method including operating a finger biometric sensor that may include an array of electric field sensing pixels and image data output circuitry coupled thereto and capable of outputting image data from a plurality of sub-arrays of the array of electric field sensing pixels, and with a dielectric layer over the array of electric field sensing pixels thereby causing electric field diffusion so that the image data output circuitry generates image data corresponding to a blurred finger image. The method may also include processing the image data using deblurring circuitry coupled to the image data output circuitry to produce, from each of the plurality of sub-arrays of the array of electric field sensing pixels, processed image data representative of a deblurred finger image.

A non-transitory computer readable medium for finger biometric processing may include computer-executable instructions capable of performing operations. The operations may include operating a finger biometric sensor that includes an array of electric field sensing pixels and image data output circuitry coupled thereto and capable of outputting image data from a plurality of sub-arrays of the array of electric field sensing pixels, and with a dielectric layer over the array of electric field sensing pixels thereby causing electric field diffusion so that the image data output circuitry generates image data corresponding to a blurred finger image. The operations may also include processing the image data using deblurring circuitry coupled to the image data output circuitry to produce, from each of the plurality of sub-arrays of the array of electric field sensing pixels, processed image data representative of a deblurred finger image.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
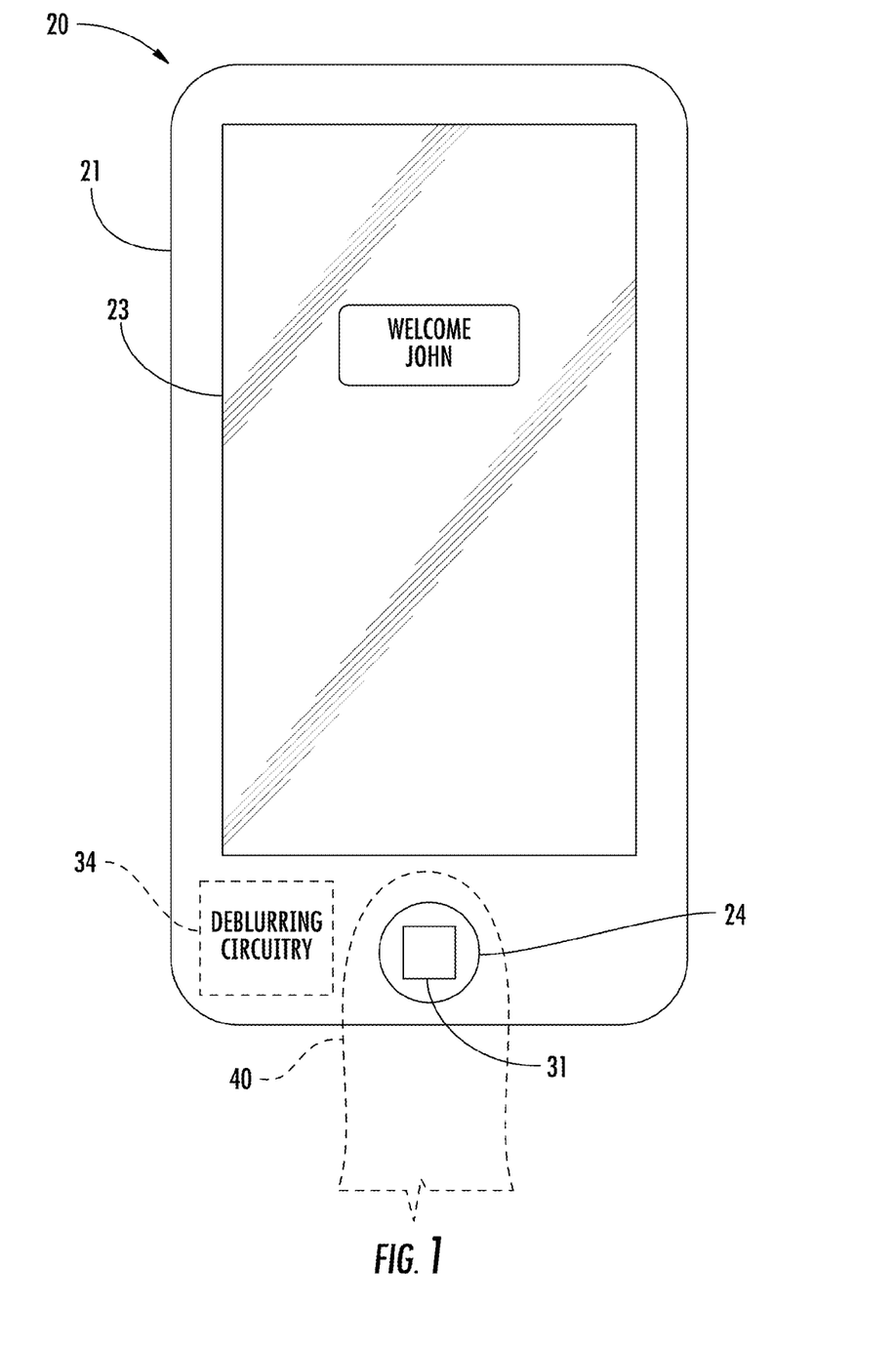
FIG. 1 is a plan view of an electronic device according to the present invention.
Figure 2:
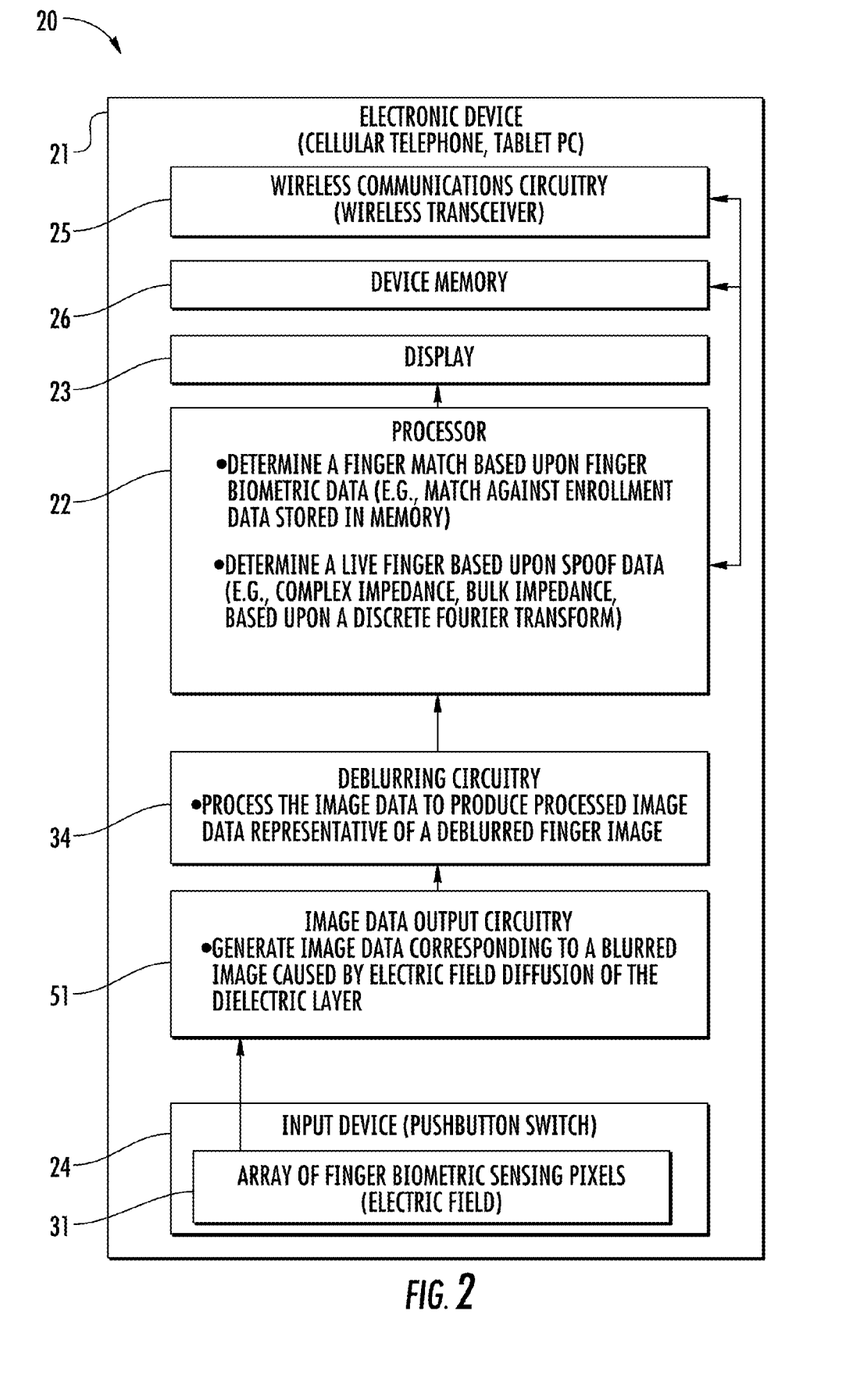
FIG. 2 is a schematic block diagram of the electronic device of FIG. 1.
Figure 3:
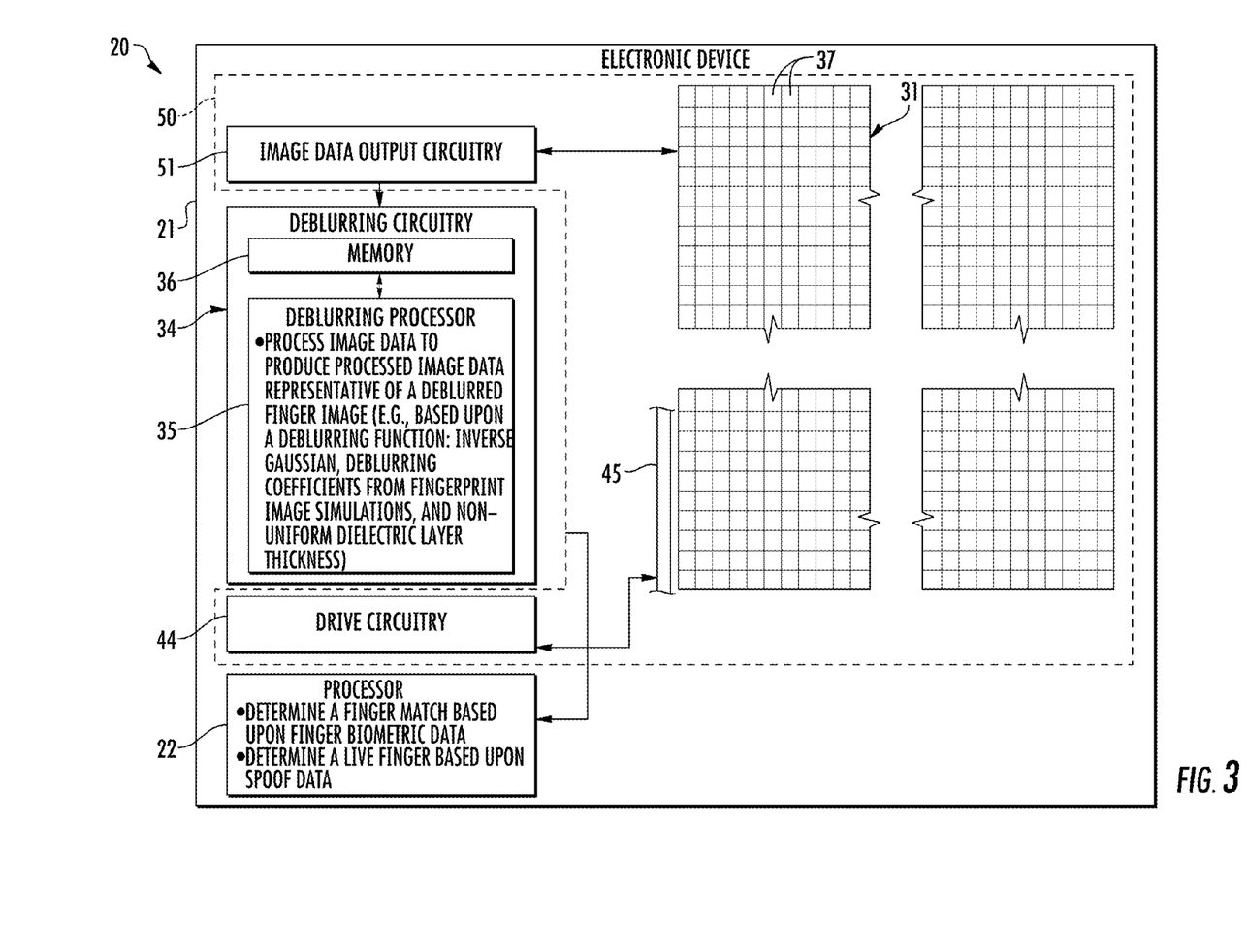
FIG. 3 is a more detailed schematic block diagram of a portion of the electronic device of FIG. 1.

Referring initially to FIGS. 1-3, an electronic device 20 is now described. The electronic device 20 illustratively includes a portable housing 21 and a processor 22, for example a host processor, carried by the portable housing. The electronic device 20 is illustratively a mobile wireless communications device, for example, a cellular telephone. The electronic device 20 may be another type of electronic device, for example, a tablet computer, laptop computer, etc.

Wireless communications circuitry 25 (e.g. a wireless transceiver, cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, a touch screen display, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device may be a different type of finger-operated user input device, for example, forming part of a touch screen display. Other or additional finger-operated user input devices may be carried by the portable housing 21.

The electronic device 20 includes a finger biometric sensor 50, which may be in the form of one or more integrated circuits (ICs). The finger biometric sensor 50 includes an array of electric field sensing pixels 31 that are part of an IC carried by the pushbutton switch 24 to sense a user's finger 40 or an object placed adjacent the array of electric field sensing pixels. Each pixel 37 may be an electric field sensing pixel as disclosed in U.S. Pat. No. 5,940,526 to Setlak et al., for example, assigned to the present assignee, and the entire contents of which are herein incorporated by reference.

The finger biometric sensor 50 also includes image data output circuitry 51 coupled to the array of electric field sensing pixels 31. The array of electric field sensing pixels 31 is carried by the pushbutton switch 24 so that when a user or object contacts and/or presses downward on the pushbutton switch, the image data output circuitry 51 cooperates with the array so that image data from the user's finger 40 is acquired, for example, finger image data for finger matching and/or spoof detection, as will be appreciated by those skilled in the art.

In other words, the array of electric field sensing pixels 31 may cooperate with the image data output circuitry 51 to be responsive to static contact or placement of the user's finger 40 or object. Of course, in other embodiments, for example, where the array of electric field sensing pixels 31 is not carried by a pushbutton switch, the array of electric field sensing pixels may cooperate with the image data output circuitry 51 to be responsive to sliding contact (i.e. a slide sensor), or responsive to static placement (i.e. a standalone static placement sensor).

Figure 4:
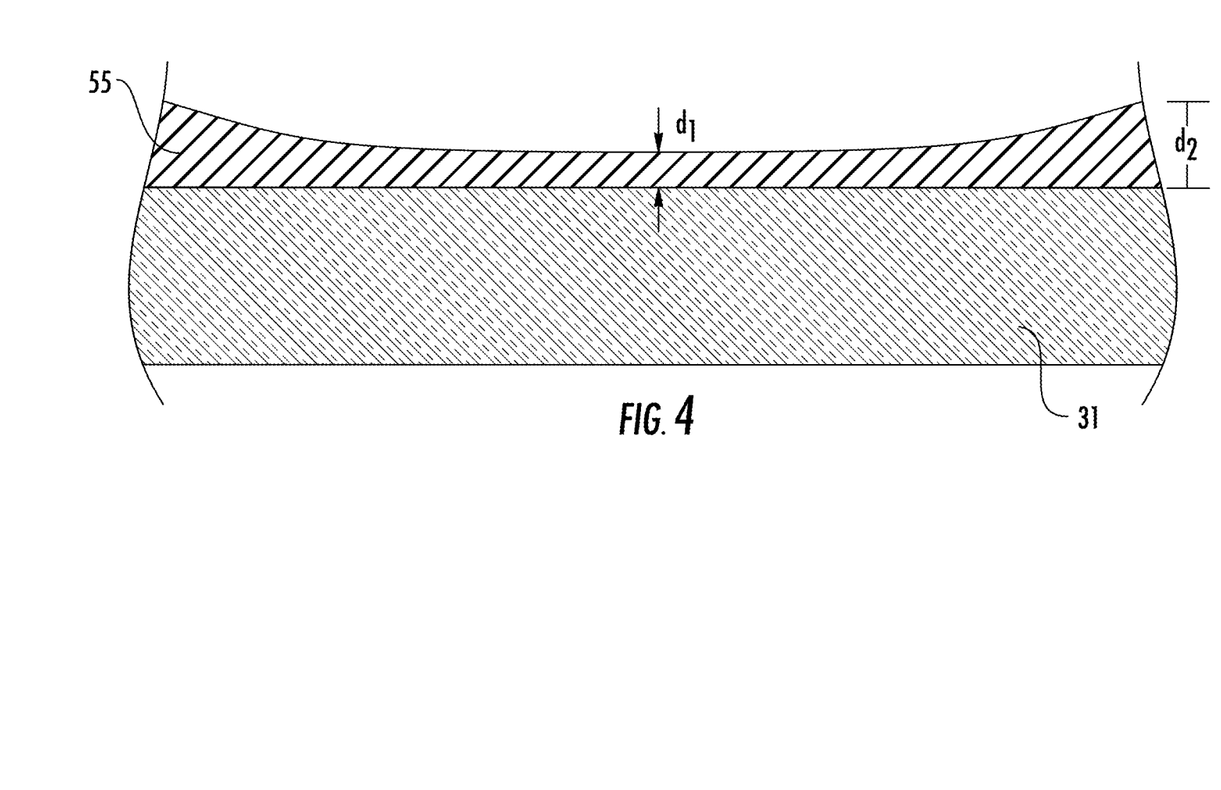
FIG. 4 is a schematic cross-section of a portion of a dielectric layer covering the array of electric field sensing pixels in accordance with the present invention.

Referring now additionally to FIG. 4, a dielectric layer 55 is over the array of electric field sensing pixels 31. The dielectric layer 55 may a protective layer of dielectric material or for aesthetics, and, for example, in some embodiments, may be part of the display 23 and/or may also be carried by the pushbutton switch 24. It should be understood that the dielectric layer 55 is generally not a passivation layer when the finger biometric sensor 50 is in the form of an IC, for example.

Figure 5A:
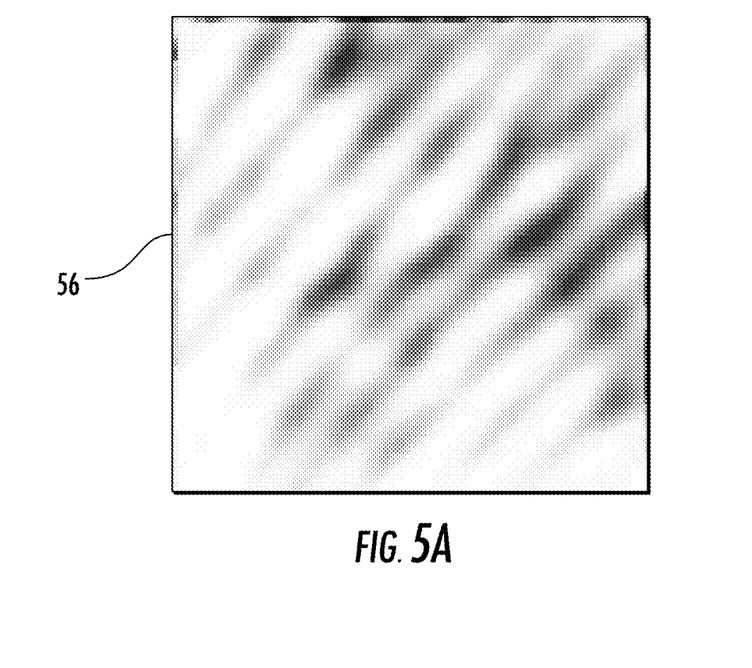
FIG. 5a is a blurred finger image caused by a dielectric layer, for example, as illustrated in FIG. 4.

The dielectric layer 55 causes an electric field diffusion. The electric field diffusion causes the image data output circuitry 51 to generate image data that corresponds to a blurred image. In other words, a finger image or fingerprint image generated from image data collected from the user's finger 40 is blurred, for example, as illustrated in the blurred finger image 56 in FIG. 5a. A blurred finger image may make it increasingly difficult to perform, for example, a matching operation, spoof detection operation, or other operation based upon the finger image. The electric field diffusion has a diffusion function associated therewith, for example, a Gaussian function.

Figure 5B:
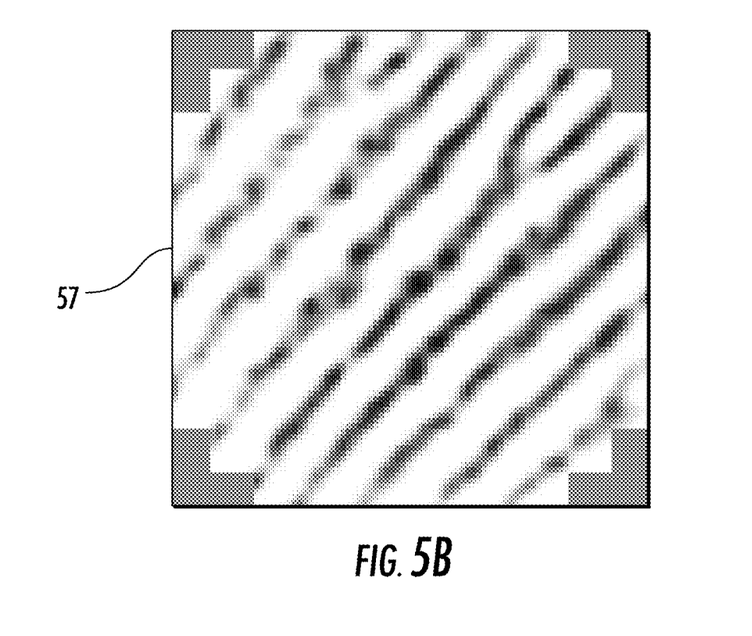
FIG. 5b is a deblurred finger image processed by the deblurring circuitry of the electronic device of FIG. 3.

The electronic device 20 also includes deblurring circuitry 34 coupled to the image data output circuitry 51. The deblurring circuitry 34 includes a deblurring processor 35 and memory 36 coupled thereto for storing the image data. The deblurring processor 35 is capable of processing the image data to produce processed image data representative of a deblurred finger image. For example, a deblurred finger image 57 processed by the deblurring circuitry 34 is illustrated in FIG. 5b. In particular, the deblurring processor 35 is capable of processing the image data to produce processed image data in accordance with a deblurring function based upon the diffusion function, for example, an inverse Gaussian function when the electric field diffusion has a Gaussian function associated therewith.

It should be understood that in some embodiments, the deblurring circuitry 34 may be part of or included in the processor 22. In other words, the functionality described herein with respect to the deblurring processor 35 may be performed by the processor 22, another processor, or shared between or among processors. Similarly, the memory 36 of the deblurring circuitry 34 may be shared with or included within the device memory 26.

In some embodiments, the dielectric layer 55 may have a non-uniform thickness. For example, the dielectric layer 55 may be curved, or the non-uniform thickness may be a result of manufacturing variances (FIG. 4) and may have a thickness that varies between 100 um-500 um. In particular, for a curved dielectric layer 55, the dielectric layer may have a first thickness d1 near the center while the ends may have a second thickness d2.

The deblurring processor 35 is capable of processing the image data to produce image data representative of the deblurred finger image based upon the non-uniform thickness. More particularly, the deblurring processor 35 may cooperate with the memory 36 to apply a deblurring function that is based also upon the thickness of the dielectric layer 55. For example, different coefficients of the deblurring function may be associated with different thicknesses of the dielectric layer 55 so that the variations of thickness across the dielectric layer are accounted for in a deblurring operation. Of course, the deblurring processor 35 may perform other or additional deblurring techniques to produce image data representative of the deblurred finger image based upon the non-uniform thickness. For example, a given one of multiple deblurring functions may be applied to a region of the array 31 as will be appreciated by those skilled in the art.

In some embodiments, the deblurring processor 35 is capable of storing deblurring coefficients for the deblurring function. For example, the deblurring processor 35 may be capable of storing deblurring coefficients in the memory 36 based upon a plurality of fingerprint image simulations. The deblurring coefficients may be generated by the deblurring processor 35, the processor 22, and/or another processor, for example, that may be remote from the electronic device 20. The deblurring function may be heuristically derived, or a learning function may be performed with respect to the coefficients. The deblurring function may thus be attempted with different coefficients across fingerprint images to determine which coefficients result in increased deblurring of the generated image data. Additional techniques may be used for deblurring or reducing the electric field diffusion using an anisotropic dielectric layer, for example as described in U.S. Pat. No. 6,088,471 to Setlak et al. and assigned to the present assignee, and the entire contents of which are herein incorporated by reference.

The processor 22 may also cooperate with the array of electric field sensing pixels 31 to determine a finger match based upon finger biometric data. More particularly, the processor 22 may determine a finger match based upon enrollment data stored in the device memory 26. The processor 22 may also determine a live finger based upon spoof data. More particularly, the processor 22 may determine a live finger based upon a complex impedance and/or bulk impedance measurement.

In some embodiments, the processor 22 may cooperate with the array of electric field sensing pixels 31 to perform a navigation function, for example. Of course the processor 22 may cooperate with the array of electric field sensing pixels 31 and/or other circuitry to perform other or additional functions, as will be appreciated by those skilled in the art.

The finger biometric sensor 50 also includes drive circuitry 44 coupled to the array of electric field sensing pixels 31 and a finger coupling electrode 45 adjacent the array of electric field sensing pixels 31 and coupled to the drive circuitry. The array of electric field sensing pixels 31 cooperates with the drive circuitry 44 to couple the user's finger 40 to a reference and generate a detected signal based upon placement of the user's finger 40 adjacent the array of electric field sensing pixels, as will be appreciated by those skilled in the art. Further details of example drive circuitry 44 and finger coupling electrode are described in U.S. Pat. No. 5,963,679, to Setlak and assigned to the present assignees, and the entire contents of which are herein incorporated by reference. As will be appreciated by those skilled in the art, additional noise or finger image compensation techniques may be used in conjunction with the deblurring circuitry 34.

A method aspect is directed to a finger biometric method that includes operating a finger biometric sensor 50 that includes an array of electric field sensing pixels 31 and image data output circuitry 51 coupled thereto. A dielectric layer 55 is over the array of electric field sensing pixels thereby causing electric field diffusion so that the image data output circuitry generates image data corresponding to a blurred finger image. The method includes processing the image data using deblurring circuitry 34 coupled to the image data output circuitry 51 to produce processed image data representative of a deblurred finger image.

A non-transitory computer readable medium for finger biometric processing aspect includes computer-executable instructions capable of performing operations that may include operating a finger biometric sensor 50 that includes an array of electric field sensing pixels 31 and image data output circuitry 51 coupled thereto. A dielectric layer 55 is over the array of electric field sensing pixels 31 thereby causing electric field diffusion so that the image data output circuitry generates image data corresponding to a blurred finger image. The computer-executable instructions are for also performing the operation processing the image data using deblurring circuitry 34 coupled to the image data output circuitry 51 to produce processed image data representative of a deblurred finger image.

Figure 6:
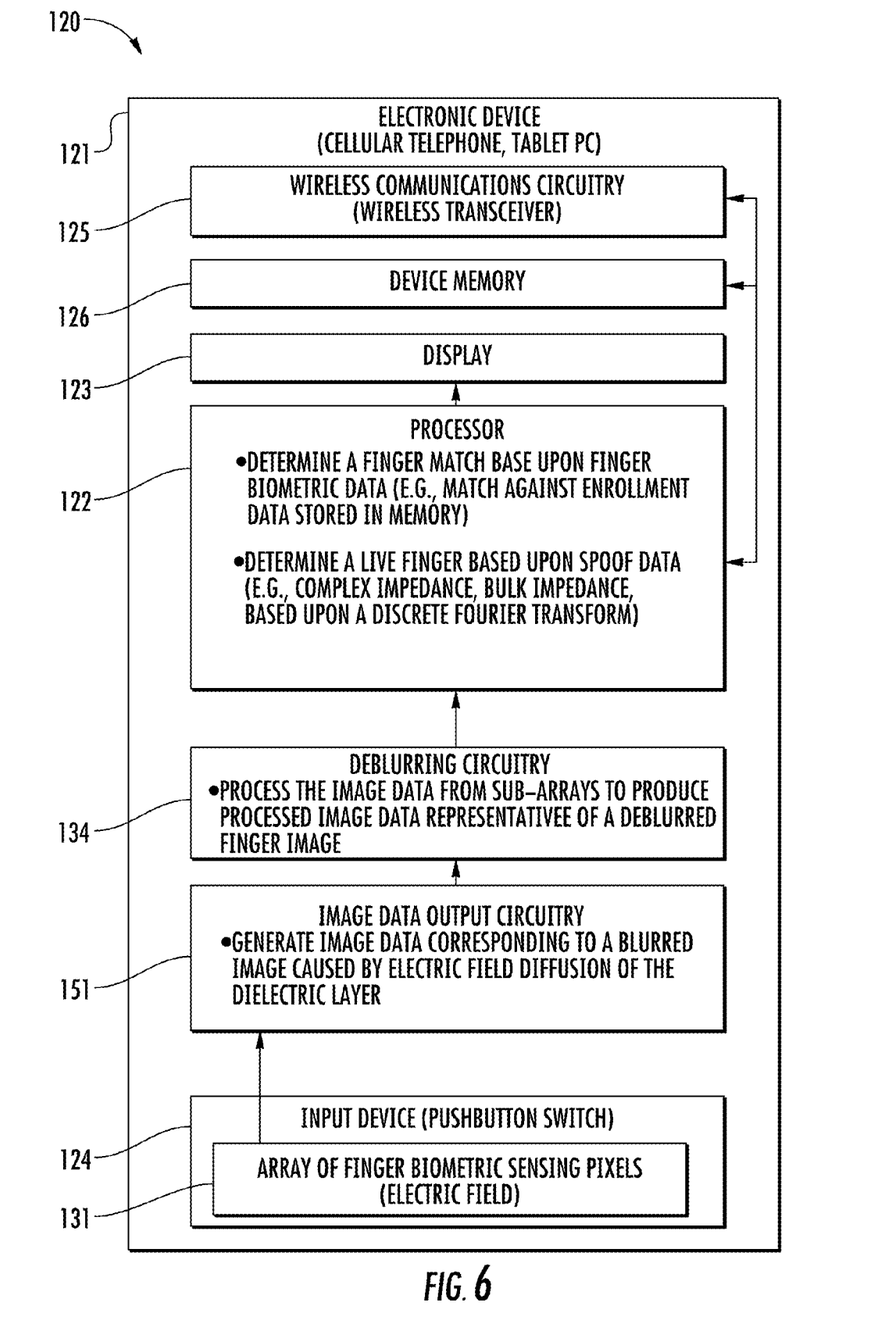
FIG. 6 is a schematic block diagram of an electronic device in accordance with another embodiment.
Figure 7:
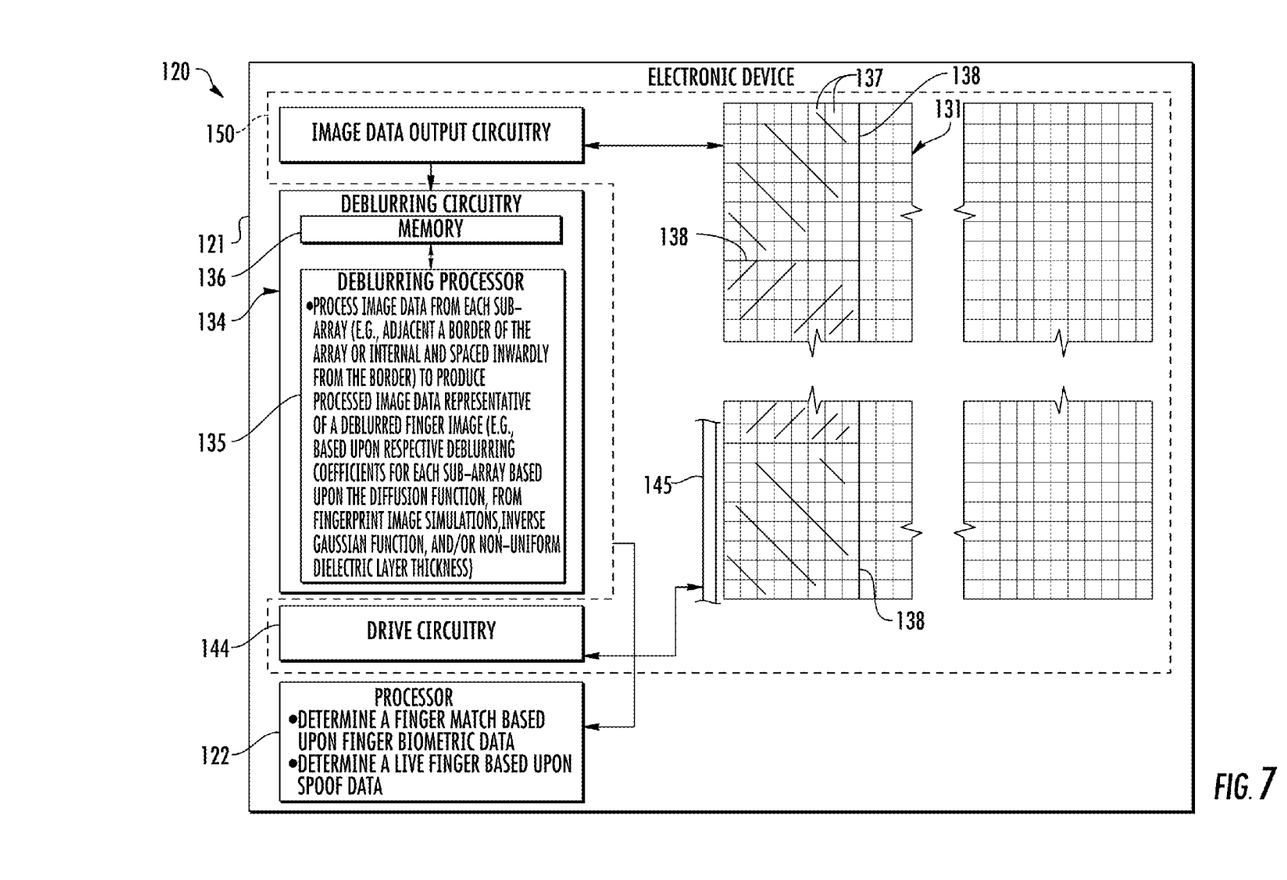
FIG. 7 is a more detailed schematic block diagram of a portion of the electronic device in of FIG. 6.

Referring now to FIGS. 6-7, in another embodiment, as will be appreciated by those skilled in the art, it may be desirable to process image data from sub-arrays 138 of the array of electric field sensing pixels 131, for example, for increased processing speed. When processing image data from each of the sub-arrays 138, a limited area of the blurred image is generally available, while a larger area of the original fingerprint image from the array 131 was blurred as a result of the dielectric layer 155, for example. Because a part of contextual information is missing from the limited area of the sub-arrays 138, the pixels 137 near image boundaries (e.g., borders of the array) or between adjacent sub-arrays, may not be easily and exactly reconstructed, even in absence of noise, for example. Additionally, a part of the image data for deblurring may be lost due to quantization (i.e. sampling and storage of pixel image data), buried by system noise, or affected by other artifacts (e.g. drive leakage).

To address this image data loss, it may be desirable to exploit prior information about the image data, for example, the finger image properties and the finger image formation model. Such prior information may include typical frequency range of features to recover, model of the blurring process (blurring kernel, frequency characteristics), model of noise, etc.

To address image boundaries, for example, at a border of the array, a classical approach would be to extend the image, and extrapolate the missing pixels using e.g. symmetric boundary conditions. However, deblurring with respect to an array of electric field finger sensing pixels generally differs from a classical deblurring application. For example, finger image data, e.g., fingerprint images, are a specific image category, wherein the frequency range of useful features is different from other image data types.

Additionally, the finger image area for finger biometric sensors may be relatively small compared to other imaging applications. For example, a finger biometric sensor may include an array of 88×88 electric field sensing pixel (500 dpi). Compared to the Gaussian blur sigma around 3 pixels for a 400 µm total dielectric layer thickness, and counting with a 3-sigma kernel for blurring/deblurring, 9 pixels around each finger image border may be considered as "boundary" pixels. In total, this represents more than one third of the electric field sensing pixels. For such a relatively small finger image, boundary conditions may become increasingly important, and classical techniques based on the assumption of "infinite" spatial extent (such as, for example, Fourier-based deconvolution techniques) become unusable.

Additionally, compared to other applications, a finger biometric sensor may have a relatively high level of noise. For example, for 300 µm ridge features, the expected signal-to-noise ratio may be around 0 dB.

The concavity, die warp, or non-parallelism of the array of electric field sensing pixels 131 versus the dielectric layer 155 over the array may lead to different blurring/deblurring kernels for different array positions. Drive leakage may also lead to different sensing characteristics near the finger image border or image data corresponding to a border of the array, or to exclusion of image regions. Without compensation, this may lead to an irregular finger image boundary.

Additionally, deblurring as it is applied to a finger biometric sensor may be subject to limited computational power. For example, the deblurring circuitry 134 may be included as part of or implemented within a secure processor that may perform other functions of a host device, for example, the electronic device 120. Thus, it may be desirable that any functions executed by the deblurring circuitry 134 be relatively simple for increased processing speed, for example.

To address the finger image data loss, deblurring circuitry 134 is used to process the image data from each of the sub-arrays 138. The deblurring circuitry 134 may process the image data from adjacent a border of the array 131 (i.e., a border sub-array) and/or from an internal sub-array that is spaced inwardly from the border of the array.

The array of electric field sensing pixels 131 has a diffusion function associated therewith. The electric field diffusion associated with the array 131 can be characterized by respective electric field diffusion functions for each of the sub-arrays 138.

The deblurring circuitry 134, and more particularly, the deblurring processor 135, processes the image data, for example, from each of the sub-arrays 138, which may include both border and internal sub-arrays, in accordance with respective deblurring functions for each of the sub-arrays and based upon the diffusion function. In other words, image data from each sub-array 138 is processed according to its respective diffusion function. This may address blurring at array positions caused by concavity, die warp, or non-parallelism of the array of electric field sensing pixels 131 versus the dielectric layer 155.

As noted above, the sub-arrays 138 may be along or may overlap a border of the array of electric field finger sensing pixels 131 (FIG. 7), and part of the image data or contextual information associated with the image data may be missing or lost along the border of the array 131. A sub-array 138, for example, for an 88×88 array of electric field sensing pixels, may be an 8×8 sub-array. A sub-array 138 may include a single pixel in some embodiments. Of course, a sub-array 138 may be another size.

Other techniques, for example, Wiener filtering, contrast enhancement filters, band-pass filtering, etc. have been attempted. In contrast to these other techniques, increased deblurring results were obtained when each diffusion function was estimated based upon a least squares problem or linear regression. To generate each deblurring function, pairs of reference images and simulated images are formed with blur, noise or other deformations. A deblurring function was attempted that reduces or minimizes the residual error between the original and reconstructed images, evaluated over a dataset of finger image data. This way, the prior information (e.g., fingerprint properties, blurring model, noise model, etc.) may be propagated into the design of each of the deblurring functions executed by the deblurring circuitry 134.

To further illustrate the problems associated with a finger image boundary (i.e., adjacent a border) as described above, image A represents a clean, original finger image, and image B represents a simulated finger image with all possible deformations (blur, noise, etc.). Both finger images are of the same size, for example, 88×88 pixels. A single pixel of the finger image A or the finger image B may be written as a(i,j), b(i,j), respectively. A rectangular area, extracted from the image B around pixel (i,j), may be denoted by b(i,j).

Let K(i,j) stand for the deblurring kernel or deblurring circuitry executing the deblurring function at position (i,j). The deblurring circuitry 134 may perform the deblurring functions as a convolution operation, for example, wherein a rectangular area of the image B is multiplied by the coefficients of K and summed to form a single pixel of the deblurred image D. To simplify notation, a matrix formulation may be used: the pixels of a rectangular finger image area, or the elements of the deblurring kernel or function, are concatenated to form a 1-dimensional column vector. Thus, the deblurring for position (i,j) may be written as:

$$d(i,j)=K(i,j)^T \cdot b(i,j)$$

where d(i,j) is a single output value, K and b are column vectors, and T represents the matrix transpose. In the following, the (i,j) coordinates are omitted with the understanding that a single location of the finger images only is still considered.

It may be desirable to find a deblurring kernel K or function so that the deblurred image D is as close as possible to the original clean finger image A. This can be formulated as a least squares problem, for example, where the residual error between the deblurred finger image and the original finger image may be reduced, summed over all finger images in the dataset. For a single location, the error norm becomes:

$$E(i,j) = \sum_z (K^T \cdot b_z - a_z)^2$$

where the index z runs over all finger images in the dataset and the deblurring kernel K is the same for all images.

This is a classical least squares problem, and the optimal kernel K may be obtained by solving the normal equation $$K^T \cdot b \cdot b^T = b \cdot a$$

where, with a slight modification of notation, the products involving vectors b and image pixels a have been accumulated over all images from the dataset. Note that only a single position (i,j) of the finger image is still being considered. In this general formulation, each position in the finger image may lead to different kernel estimation, for example, as will be appreciated by those skilled in the art.

Figure 8A:
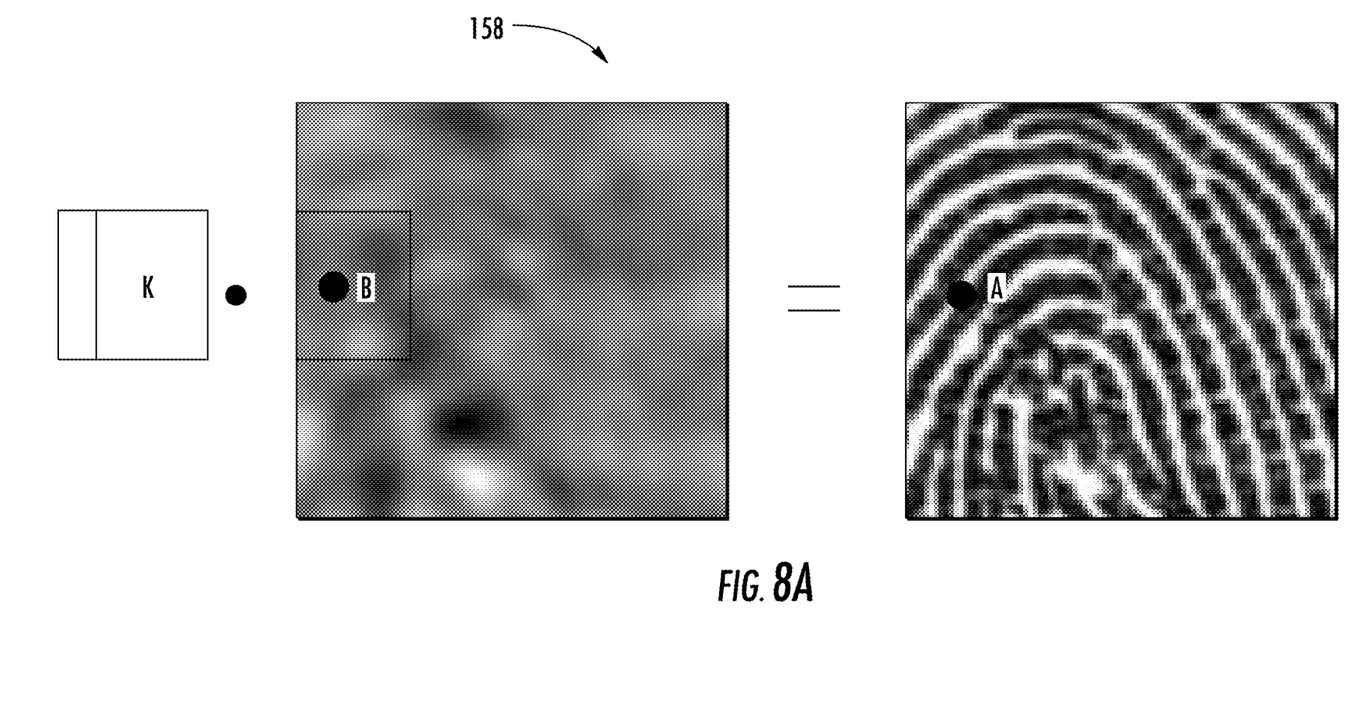
FIG. 8a illustrates a portion of a blurred finger image processed according to a deblurring function in accordance with an embodiment.
Figure 8B:
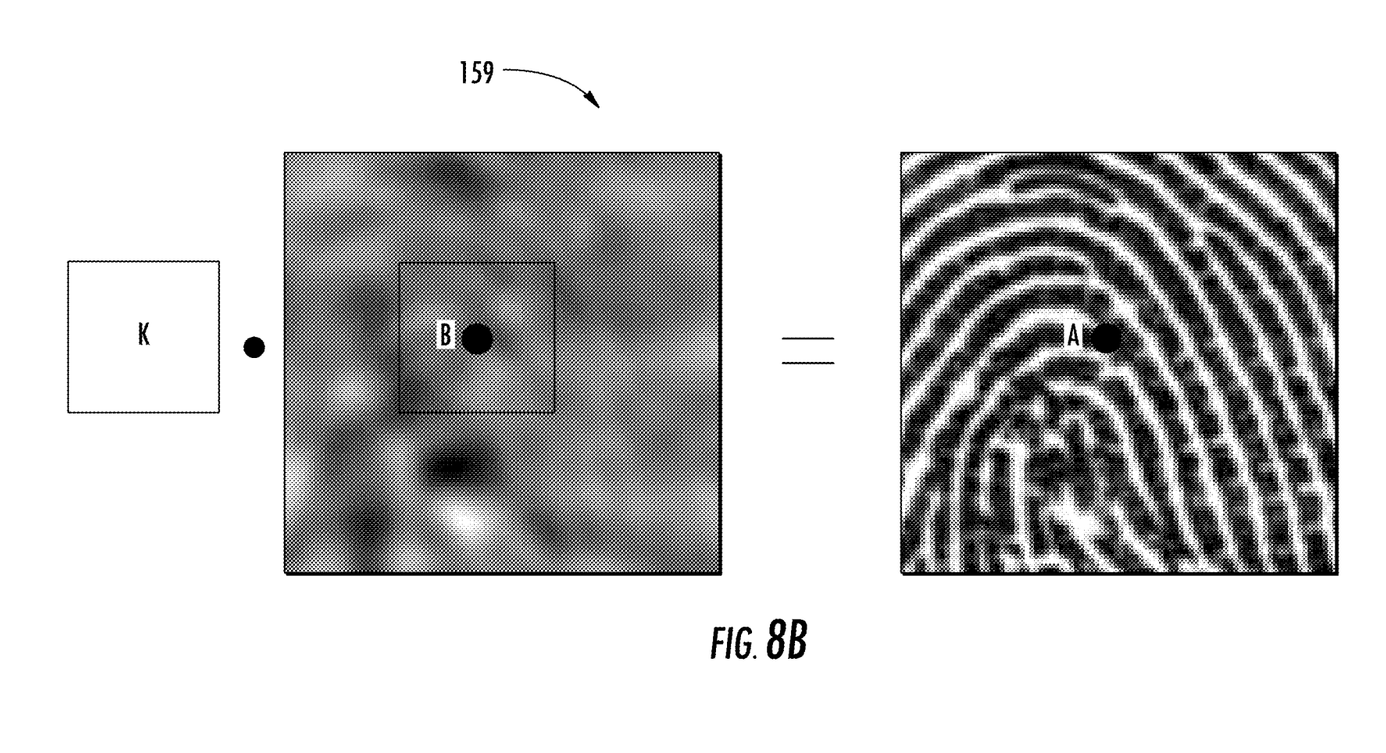
FIG. 8b illustrates a border portion of a blurred finger image processed according to a deblurring function in accordance with an embodiment.

Referring now additionally to the illustrations 158 and 159 in FIGS. 8a and 8b, the kernel K is applied to an area of an image B (corresponding to a sub-array of the array of electric field finger sensing pixels), to obtain a single pixel that is equal to the pixel of the original image A (not shown). This relation is used to formulate the minimization problem and estimate the kernel K or deblurring function from the original-blurred image or sub-array.

For positions adjacent the border of the image or array 131 (FIG. 8b), a part of the image pixels B are generally valid. Thus, a subset of deblurring coefficients for each deblurring function, or the deblurring kernel K, are to be estimated.

The estimation of the deblurring kernel or each deblurring function, including the deblurring coefficients, from the image data will now be described in further detail. The dimension of the deblurring kernel K or each deblurring function can be chosen, for example, to have a size between 5×5 and 15×15 pixels, centered around each image position. The kernel size may be indexed by the size from the center, k. A kernel size 15×15 corresponds to k=7.

For kernels or deblurring functions inside the finger image (i.e., not adjacent the boundary of the array 131 as illustrated the in FIG. 8a), a kernel of (2k+1)×(2k+1) pixels has, in general, (2k+1)×(2k+1) deblurring coefficients. The number of deblurring coefficients may be reduced by making assumptions about the image data or kernel symmetry, as will be appreciated by those skilled in the art. Also, a reduced number of coefficients near the border of the array 131 or finger image border may also be used with each deblurring function (FIG. 8b).

To obtain an increasingly reliable estimate of the large number of deblurring coefficients, a relatively good number of training samples for the least square problem may be desired. Again, exploiting symmetries typically reduces the number of finger images or image data and also may reduce the risk of over-fitting.

In the normal equation above, the products $b \cdot b^T$ and $b \cdot a$ are accumulated from all images in the training set, separately for each position:

$$X(i, j) = \sum_z b_z(i, j) \cdot b_z(i, j)^T$$

$$Y(i, j) = \sum_z b_z(i, j) \cdot a_z(i, j)$$

For a single position (i,j), note that the dimension of the matrix X is [(2k+1)×(2k+1)]×[(2k+1)×(2k+1)]. For a 15×15 kernel or a deblurring function corresponding to a 15×15 sub-array (k=7), X is a 225×225 matrix. The column vector Y includes [(2k+1)×(2k+1)] values.

Using X and Y, the normal equations for kernel K can be rewritten into:

$$K^T \cdot X = Y$$

In some embodiments, the kernel or deblurring function estimation may be an offline process, wherein such estimation or function may be simulated, for example, using a computer program, such as, for example, Matlab®. Of course, other programs may be used to solve such an equation or generate each deblurring function. The kernel for position (i,j) can then be obtained using matrix division:

$$K^T = Y/X.$$

Other circuitry or elements illustrated but not specifically described with respect to FIGS. 6-7 are similar to those described above with respect to FIGS. 2-5 and require no further discussion herein. As will be appreciated by those skilled in the art, while applying the diffusion functions to each of the sub-arrays 138 may be particularly advantageous for deblurring a blurred finger image, the deblurring circuitry 134 using the deblurring functions may also be advantageous for reducing false positives with respect to finger matching and/or spoof detection. Moreover, by using sub-arrays 138 and applying a linear regression, a more accurate deblurred finger image may result, especially adjacent borders of the array 131.

A method aspect includes operating a finger biometric sensor 150 that includes an array of electric field sensing pixels 131 and image data output circuitry 151 coupled thereto. A dielectric layer 155 is over the array of electric field sensing pixels 131 thereby causing electric field diffusion so that the image data output circuitry 151 generates image data corresponding to a blurred finger image. The method also includes processing the image data using deblurring circuitry 134 coupled to the image data output circuitry 151 to produce, from each of a plurality of sub-arrays 138 of the array of electric field sensing pixels 131 each having a diffusion function associated with the electric field diffusion, and in accordance with a respective deblurring function associated with each diffusion function, processed image data representative of the deblurred finger image.

A non-transitory computer readable medium for finger biometric processing includes computer-executable instructions capable of performing operations that may include operating a finger biometric sensor 150 that includes an array of electric field sensing pixels 131 and image data output circuitry 151 coupled thereto, and with a dielectric layer 155 over the array of electric field sensing pixels thereby causing electric field diffusion so that the image data output circuitry generates image data corresponding to a blurred finger image. The operations may also include processing the image data using deblurring circuitry 134 coupled to the image data output circuitry 151 to produce, from each of a plurality of sub-arrays 138 of the array of electric field sensing pixels each having a diffusion function associated with the electric field diffusion, and in accordance with a respective deblurring function associated with each diffusion function, processed image data representative of the deblurred finger image.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. An electronic device comprising:
a finger biometric sensor comprising a plurality of sub-arrays of electric field sensing pixels and output circuitry coupled thereto;

a dielectric layer over the plurality of sub-arrays of electric field sensing pixels and causing electric field diffusion so that the output circuitry generates blurred finger image data; and deblurring circuitry coupled to the output circuitry and capable of
storing a plurality of deblurring coefficients, and
processing the blurred finger image data using the plurality of deblurring coefficients to produce deblurred finger image data.

2. The electronic device of claim 1, wherein the plurality of deblurring coefficients comprises a respective set of deblurring coefficients for each of a plurality of different deblurring functions.

3. The electronic device of claim 2, wherein the deblurring circuitry is capable of processing the blurred finger image data based upon a respective deblurring function for each sub-array of electric field sensing pixels.

4. The electronic device of claim 1, wherein the plurality of sub-arrays of electric field sensing pixels define an array having a border; and wherein the plurality of sub-arrays of electric field sensing pixels comprises at least one border sub-array of electric field sensing pixels adjacent to the border.

5. The electronic device of claim 1, wherein the plurality of sub-arrays of electric field sensing pixels define an array having a border; and wherein the plurality of sub-arrays of electric field sensing pixels comprises at least one interval sub-array of electric field sensing pixels spaced inwardly from the border.

6. The electronic device of claim 1, wherein the electric field diffusion has a diffusion function associated therewith; and wherein the deblurring circuitry is capable of processing the blurred finger image data in accordance with respective different deblurring functions for each of the plurality of sub-arrays of electric field sensing pixels based upon the diffusion function.

7. The electronic device of claim 6, wherein the diffusion function comprises a Gaussian function and the respective deblurring functions each comprises an inverse Gaussian function.

8. The electronic device of claim 1, wherein the dielectric layer has a non-uniform thickness.

9. The electronic device of claim 1, wherein the deblurring circuitry comprises a deblurring processor and memory coupled thereto.

10. The electronic device of claim 1, wherein the finger biometric sensor further comprises drive circuitry coupled to the plurality of sub-arrays of electric field sensing pixels.

11. The electronic device of claim 10, wherein the finger biometric sensor comprises a finger coupling electrode adjacent the plurality of sub-arrays of electric field sensing pixels and coupled to the drive circuitry.

12. A method comprising:
operating a finger biometric sensor comprising a plurality of sub-arrays of electric field sensing pixels and output circuitry coupled thereto, and a dielectric layer over the plurality of sub-arrays of electric field sensing pixels and causing electric field diffusion so that the output circuitry generates blurred finger image data;
storing a plurality of deblurring coefficients; and
processing the blurred finger image data using the plurality of deblurring coefficients to produce deblurred finger image data.

13. The method of claim 12, wherein the plurality of deblurring coefficients comprises a respective set of deblurring coefficients for each of a plurality of different deblurring functions.

14. The method of claim 13, wherein processing comprising processing the blurred finger image data based upon a respective deblurring function for each sub-array of electric field sensing pixels.

15. The method of claim 12, wherein the plurality of sub-arrays of electric field sensing pixels define an array having a border; and wherein the plurality of sub-arrays of electric field sensing pixels comprises at least one border sub-array of electric field sensing pixels adjacent to the border.

16. The method of claim 12, wherein the plurality of sub-arrays of electric field sensing pixels define an array having a border; and wherein the plurality of sub-arrays of electric field sensing pixels comprises at least one interval sub-array of electric field sensing pixels spaced inwardly from the border.

17. The method of claim 12, wherein the electric field diffusion has a diffusion function associated therewith; and wherein processing comprises processing the blurred finger image data in accordance with respective different deblurring functions for each of the plurality of sub-arrays of electric field sensing pixels based upon the diffusion function.

18. The method of claim 17, wherein the diffusion function comprises a Gaussian function and the respective deblurring functions each comprises an inverse Gaussian function.

19. A non-transitory computer readable medium for finger biometric processing, the non-transitory computer readable medium comprising computer-executable instructions capable of performing the operations comprising:
operating a finger biometric sensor comprising a plurality of sub-arrays of electric field sensing pixels and output circuitry coupled thereto, and a dielectric layer over the plurality of sub-arrays of electric field sensing pixels and causing electric field diffusion so that the output circuitry generates blurred finger image data;
storing a plurality of deblurring coefficients; and
processing the blurred finger image data using the plurality of deblurring coefficients to produce deblurred finger image data.

20. The non-transitory computer readable medium of claim 19, wherein the plurality of deblurring coefficients comprises a respective set of deblurring coefficients for each of a plurality of different deblurring functions.

21. The non-transitory computer readable medium of claim 20, wherein processing comprising processing the blurred finger image data based upon a respective deblurring function for each sub-array of electric field sensing pixels.

22. The non-transitory computer readable medium of claim 19, wherein the plurality of sub-arrays of electric field sensing pixels define an array having a border; and wherein the plurality of sub-arrays of electric field sensing pixels comprises at least one border sub-array of electric field sensing pixels adjacent to the border.

23. The non-transitory computer readable medium of claim 19, wherein the plurality of sub-arrays of electric field sensing pixels define an array having a border; and wherein the plurality of sub-arrays of electric field sensing pixels comprises at least one interval sub-array of electric field sensing pixels spaced inwardly from the border.

24. The non-transitory computer readable medium of claim 19, wherein the electric field diffusion has a diffusion function associated therewith; and wherein processing comprises processing the blurred finger image data in accordance with respective different deblurring functions for each of the plurality of sub-arrays of electric field sensing pixels based upon the diffusion function.

25. The non-transitory computer readable medium of claim 24, wherein the diffusion function comprises a Gaussian function and the respective deblurring functions each comprises an inverse Gaussian function.

* * * * *

UNITED STATES PATENT AND TRADEMARK OFFICE
CERTIFICATE OF CORRECTION

PATENT NO. : 9,443,293 B2
APPLICATION NO. : 15/049341
DATED : September 13, 2016
INVENTOR(S) : Setlak et al.

Page 1 of 1

It is certified that error appears in the above-identified patent and that said Letters Patent is hereby corrected as shown below:

In the claims,

| | |
|---|---|
| Column 12, Lines 5-6 | Delete: "processing comprising processing" <br> Insert: --processing comprises processing-- |
| Column 12, Line 51 | Delete: "processing comprising processing" <br> Insert: --processing comprises processing-- |

Signed and Sealed this
First Day of November, 2016

Michelle K. Lee
*Director of the United States Patent and Trademark Office*